United States Patent [19]

Niman, Jr.

[11] 4,063,841
[45] Dec. 20, 1977

[54] INDEXABLE INSERT FOR GROOVING TOOLS

[75] Inventor: Joseph Niman, Jr., Sterling Heights, Mich.

[73] Assignee: Posa-Cut Corporation, Sterling Heights, Mich.

[21] Appl. No.: 703,485

[22] Filed: July 8, 1976

[51] Int. Cl.² .......................... B26D 1/00; B26D 1/12
[52] U.S. Cl. ................................. 407/70; 407/102; 407/107; 407/113; 407/117; 408/239 R
[58] Field of Search ................... 29/95, 96, 97, 98; 408/231, 232, 233, 713, 238, 239, 240

[56] References Cited

U.S. PATENT DOCUMENTS

| Re. 25,955 | 2/1966 | Emmons | 29/95 R |
|---|---|---|---|
| 2,289,464 | 7/1942 | Simmons | 29/95 R |
| 3,205,558 | 9/1965 | Stier | 29/96 |
| 3,245,288 | 4/1966 | Fried | 29/96 |
| 3,653,107 | 4/1972 | Hertel | 29/96 |
| 3,805,350 | 4/1974 | Stein | 29/96 |
| 3,813,746 | 6/1974 | Price | 29/96 |

FOREIGN PATENT DOCUMENTS

| 67,957 | 3/1943 | Denmark | 29/96 |

Primary Examiner—Harrison L. Hinson
Attorney, Agent, or Firm—Cullen, Settle, Sloman & Cantor

[57] ABSTRACT

An indexable insert for cutting internal and external grooves in a workpiece is adapted for mounting and securing upon a tool holder having a pocket therein; whose bottom edges define an obtuse angle. The insert comprises an elongated body of rectangular cross section having a flat top surface along one edge of the body and a pair of angular bottom surfaces extending from a central point of the body and inclined toward and extending to said top surface at a corresponding included obtuse angle. These inclined surfaces define a pair of separately usable transverse cutting edges at the opposite ends of said body which is adapted for snug registry within said pocket. Said pocket also defines within the tool holder a back up plate against which the insert bears. The insert, one or more, is held down within said pocket by a clamp which bears across the top edges of said inserts. A cam lock device is also mounted upon said holder to apply lateral pressure to the insert holding it snugly against the back up wall. The preferred angle involved is 140 degrees approximately or in the range of 130° to 150°.

15 Claims, 13 Drawing Figures

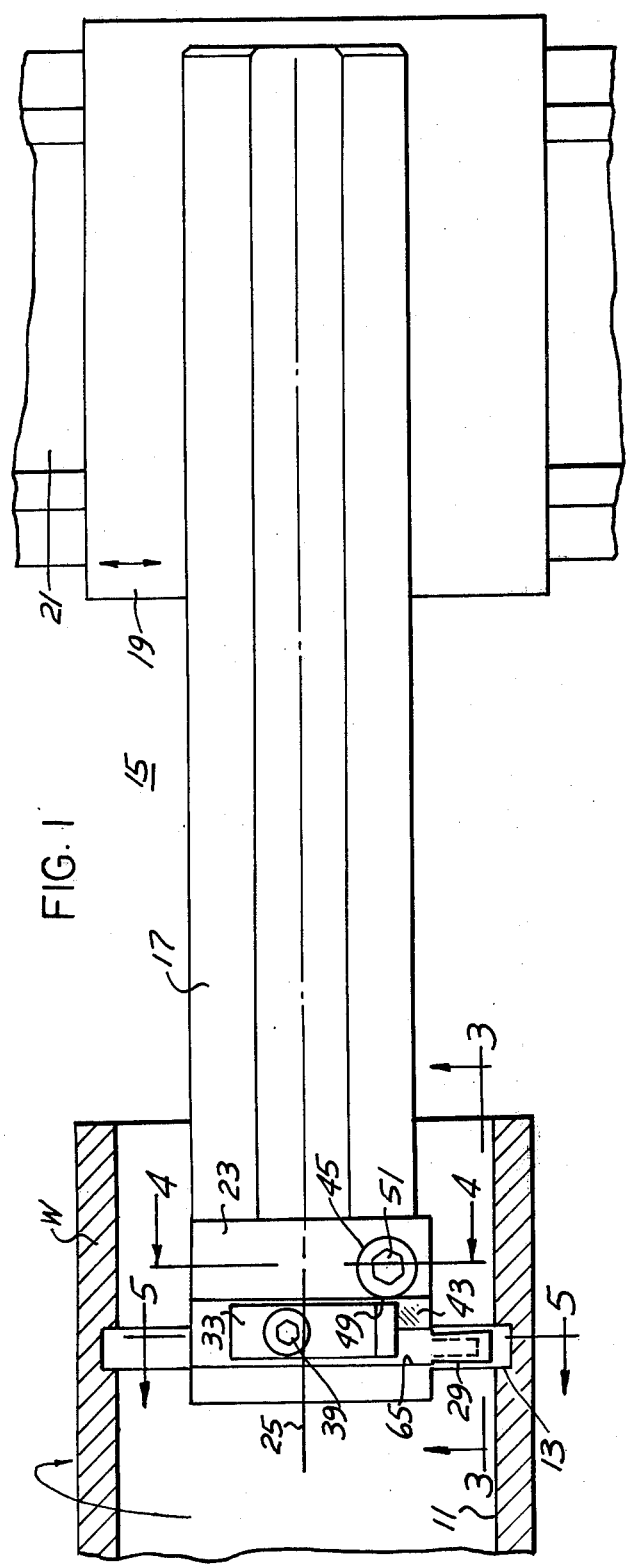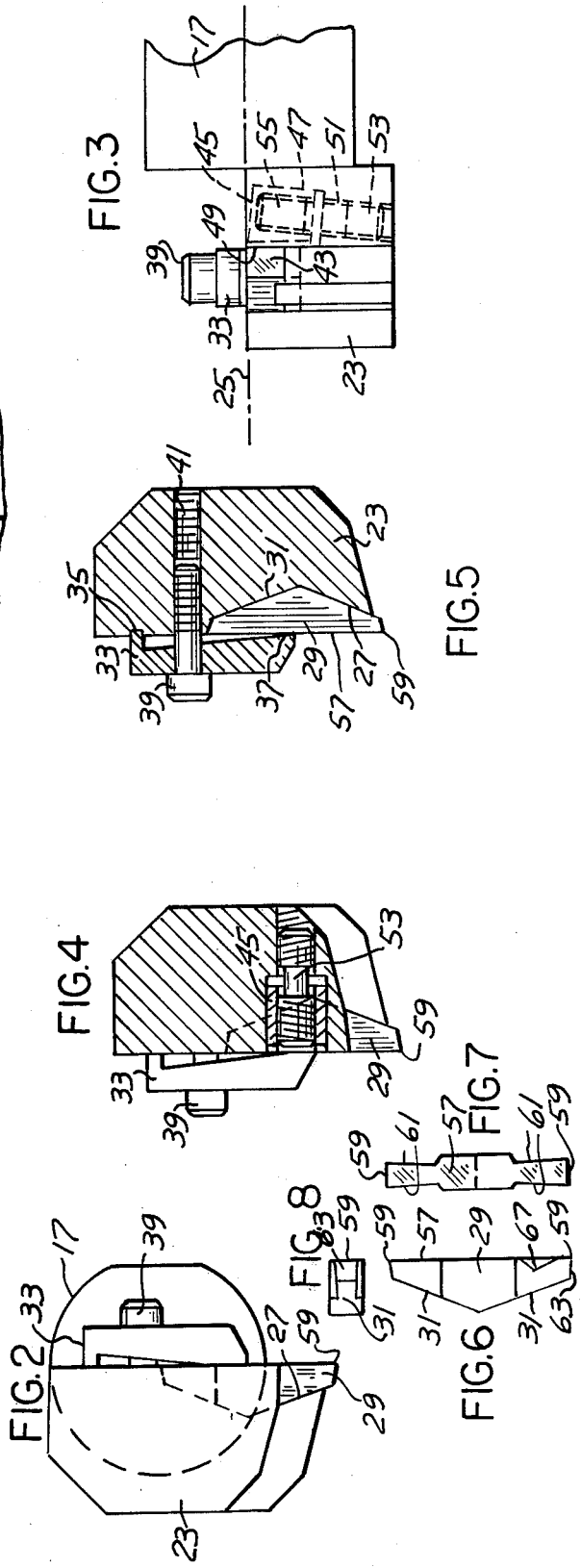

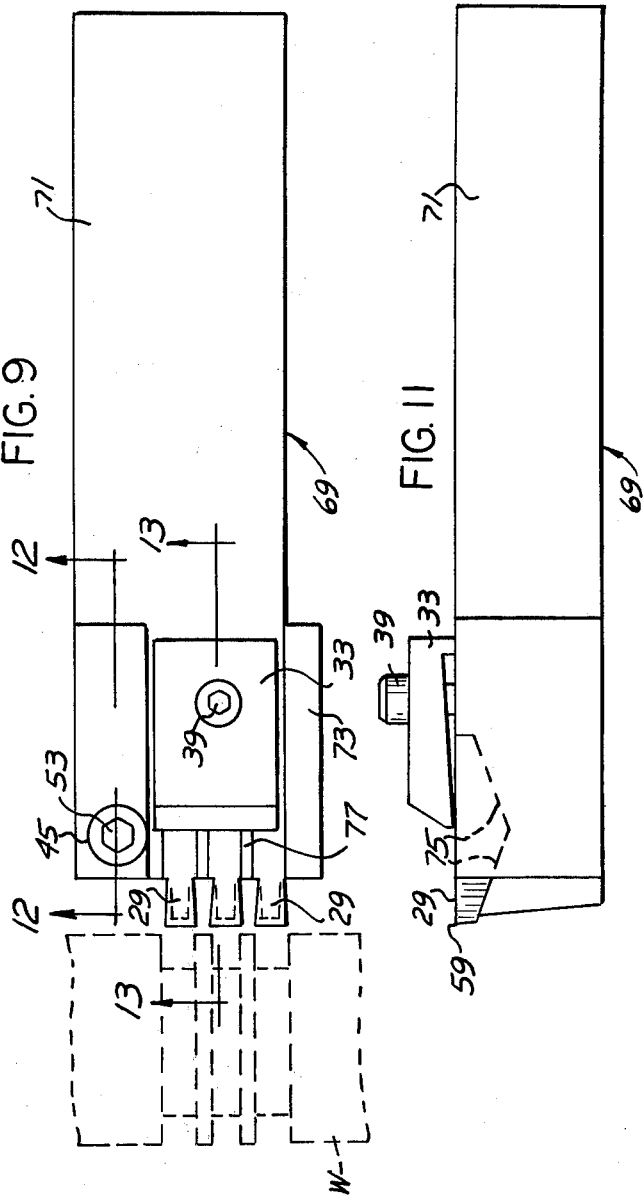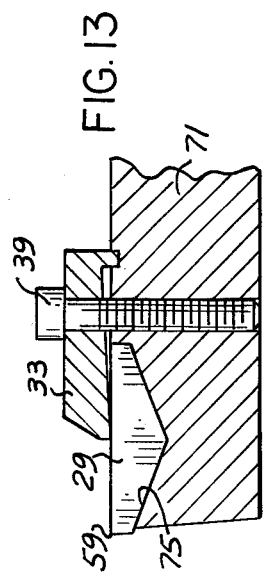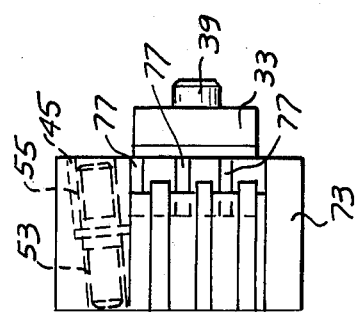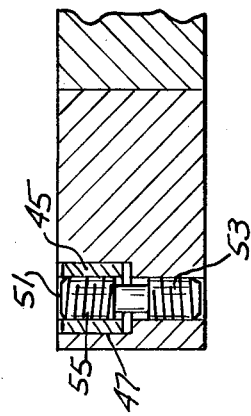

INDEXABLE INSERT FOR GROOVING TOOLS

BACKGROUND OF THE INVENTION

Heretofore, in the use of grooving tools for internal grooves as well as external grooves, but particularly in the case of internal grooves, there has existed the difficulty of a limited depth of cut due to the dimensional requirement that the tool holder must fit within the rotating workpiece. Other difficulties have existed in accurate relocation of the insert after it has been indexed to utilize an unworn cutting edge and to assure that for repetitive grooves, the cutting edges will be accurately prelocated for a precise control of the extension of the insert from the holder.

Other difficulites have occurred in the accurate securing of the indexable insert within a portion of the holder against longitudinal as well as transverse movements with respect to the holder.

Illustrative of the art of anchoring indexable inserts within a holder are the earlier issued patents of Applicant's Assignee, i.e.: U.S. Pat. Nos. 3,455,002, 3,436,799, 3,938,230.

SUMMARY OF THE INVENTION

It is an object of the present invention to provide an an improved indexable insert for cutting internal and external grooves which will have the ability to reach large depths of cut without having the overall height of the insert to become too large to allow entry of the insert and its holder within the bore of a rotating workpiece.

It is another object to provide a socket within the tool holder or the tool holder head arranged either axially or transversely of the holder axis and which includes obtuse angularly related botton surfaces, into which is snugly projected the correspondingly shaped bottom surfaces of the indexable insert.

It is a further object to provide an indexable insert grooving tool of this construction and within the aforesaid pocket, there is inserted one or a plurality of indexable inserts of the same or different length and of the same or different widths for providing one or a plurality of internal or external grooves in a workpiece.

These and other objects will be seen from the following specification and claims in conjunction with the appended drawings.

THE DRAWINGS

FIG. 1 is a fragmentary plan view of the present indexable insert grooving tool as mounted upon a transversely adjustable slide for cutting an internal groove in a workpiece fragmentarily shown.

FIG. 2 is an end view thereof.

FIG. 3 is a fragmentary side elevational view thereof.

FIG. 4 is a section taken in the direction of arrows 4—4 of FIG. 1.

FIG. 5 is a section taken in the direction of arrows 5—5 of FIG. 1.

FIG. 6 is a side elevational view of the present indexable insert.

FIG. 7 is an end elevational view thereof and corresponding to the top surface of the indexable insert.

FIG. 8 is a plan view thereof.

FIG. 9 is a fragmentary plan view of an external grooving tool with indexable inserts, shown with respect to a rotatable workpiece fragmentarily illustrated.

FIG. 10 is an end view thereof.

FIG. 11 is a side elevational view thereof.

FIG. 12 is a fragmentary section taken in the direction of arrows 12—12 of FIG. 9.

FIG. 13 is a fragmentary view taken in the direction of arrows 13—13 of FIG. 9.

DETAILED DESCRIPTION OF THE INVENTION

Referring to the drawing and particularly FIGS. 1 through 8, there is shown an indexable insert grooving tool for internal application and in FIGS. 9 through 13, an external multiple grooving tool with indexable inserts.

In all cases, the insert or inserts for multiple groove application, will be held in a pocket ground into the holder or head therefor with the bottom surfaces of said pocket defining an included obtuse angle of about 140°. The pocket is adapted to receive the correspondingly angled bottom surface of the indexable insert which is secured within the holder by a wedging type of device bearing against side portions thereof and also secured within the holder by a top clamp.

The inserts which from the top view, FIG. 8, are basically rectangular, have when viewed from the side, an angle ground along the bottom edge, with the surfaces extending from the central point on the body of the insert and inclined towards and extend to the top surface and defining an included obtuse angle of about 140° approximately. For internal grooving, the inserts are nested within a socket which extends transverse of the longitudinal axis of the tool holder, and for external grooving including multiple grooving the pocket will extend longitudinally of the axis of the tool holder such as shown in FIGS. 9 and 11.

Referring to FIG. 1, a workpiece W fragmentarily shown is mounted for rotation such as indicated by the arrow, and includes a bore 11 into which an annular groove 13, or multiple grooves are to be formed by the present indexable insert grooving tool 15. Said tool includes an elongated shank 17 of predetermined shape, preferably polygonal, whose one end is nested and secured within the transverse slide 19 which is mounted upon the support ways 21 forming part of the base of the machine. The shank and the attached insert may be indexed in a direction transverse to the longitudinal axis 25 of said shank and which also corresponds to the longitudinal axis of the workpiece W.

Upon the other end of the shank is head 23 which is offset with respect to axis 25 of the shank as best shown in FIG. 3, and whose top surface lies in a plane passing through said axis.

As best shown in FIG. 5, an elongated transverse pocket is ground into head 23 down into its top surface adapted to snugly receive the indexable double ended insert 29.

The aforesaid groove is defined by a pair of angular bottom surfaces 27 which extend towards each other at an included angle of 140°, for illustration. One of the side walls of the pocket 27 is defined as a back up wall 65 against which the insert 29 is secured.

While the included angle of the bottom surfaces 27 of the pocket have been defined as 140° approximately, it is contemplated that this included angle could be varied within the range of 130° to 150° approximately.

The clamp 33 referred to as a top clamp at one end is anchored as at 35 upon the offset head, FIG. 5, and at its other end has a grip portion 37 adapted to engage the top surface of the insert. Socket headed screw 39 extends through the top clamp and is adjustably threaded within the bore 41. Since the bottom surfaces 27 are of unqual length, it appears that the outer cutting end of the insert 29 projects laterally outward of the head adapted for engagement with workpiece W in the manner shown in FIG. 1.

Since normally the transverse pocket 27 is wider than the insert 29, a suitable spacer 43 is positioned within the pocket against one side of said insert.

The wedge or side clamp 45 is nested within an angular bore 47, of approximately 7° for illustration and includes a machined outer edge face 49 in operative registry with the insert.

The screw 51 has a right hand thread 53 on one end thereof and is adapted for threading within a corresponding bore in said head. The opposite end of said screw has a left hand thread 55 normally of a different pitch than thread 53 and is threaded into the cam wedge 45. Said screw has an Allen socket at its upper end as shown in FIG. 1.

In normal use, the cam wedge 45 is threaded on one end of the screw 51 and the other end at 53 is threaded into the holder body on the corresponding 7° angle. On rotation of the screw in a clockwise direction, the wedge is caused to move down upon the screw and closer to the insert or spacer 43. Eventually, the wedge contacts the insert or spacer and applies lateral pressure thereto tightly anchoring the insert with respect to the back up wall 65. Operation of the screw in the opposite direction reverses the process and frees the insert or inserts or spacer to allow removal for indexing the unused cutting edge or replacement by a new insert.

The detail of construction of the present indexable insert is shown in FIGS. 6, 7 and 8. The insert includes a body which has a normally flat top surface 57 with a pair of cutting corners 59 at its opposite ends. Top surface 57 may also include an angular grind 67 of 0 to 15° running downward from surface 59 and back along surface 59 approximately one-half the distance to the center of the surface 59.

As above referred to, the bottom surface of the insert is arranged at an included obtuse angle of 140°, for illustration, defined by the pair of angular bottom surfaces 31, FIG. 6. These meet at the center of the body and extend outwardly and upwardly towards the top surface 57 and to define therewith the transverse cutting edges 59.

Short of the outer ends of the inclined surfaces 31, clearance angle faces 63 are formed to define the transverse cutting corners 59 which correspond to that portion of the insert adapted to operatively engage the workpiece to form the groove 13 therein, FIG. 1.

Upon the opposed end faces of the insert body at its opposite ends and lying in planes substantially at right angles to the transverse cutting edges 59 are the slightly tapered end face clearance angles 61 as best shown in FIG. 7. These extend from the maximum width at the end of the cutting edges 59 and are tapered slightly inwardly at an angle in the range of 0° to 10°, for illustration, to provide a clearance angle to facilitate chip removal and to avoid overheating of the insert during the grooving action.

As shown in FIG. 5, the angular bottom surfaces 27 which define the pocket receive the correspondingly angled bottom surfaces 31 for snug and accurate nesting therein so as to guarantee a predetermined location of the insert with respect to the head or tool holder after indexing and after replacement to thus accurately define the nature and location of the internal groove 13 formed in FIG. 1 within the workpiece.

By the present construction, much larger depths of cut may be formed within the bore of the workpiece without having the overall height of the insert and included the tool holder become too large to allow entry within the workpiece bore 11.

A 140° included angle on the bottom surfaces 27 permits extremely accurate positioning of the insert in the holder giving precise control of the extension of the insert from the holder.

While the 140° shaped included angle for the pocket and corresponding angle for the bottom surface of the insert has been described for illustration as the preferred form, it is contemplated that this obtuse angular relationship could be maintained varying the angle in the range of approximately 130 to 150°. Accordingly, the present indexable insert grooving tool can cut depths greater than generally available with triangular or square insert tools.

The present grooving tool is capable of cutting a number of spaced grooves, either the same or of different depth or width by the utilization of additional inserts spaced apart within the pocket and effectively secured and retained therein. Utilizing the present spacer 43, this will prevent the insert from moving towards the back of the holder during the cut. The side holding device or cam wedge 45 is used to insure that the inserts are clamped in the transverse direction and also insure that the inserts are properly located dimensionally in the holder. The top clamp 33 is also provided to retain the inserts from the top thereof.

MODIFICATION

A modified form of indexable insert external grooving tool 69 is illustrated in FIGS. 9 through 13. In this tool there is provided the elongated shank 71 of predetermined cross sectional shape adapted for mounting within a suitable support. Said shank normally extends at right angles to the axis of a rotating workpiece W, fragmentarily shown. One end of the shank includes the head edge plate 73. In this case, the angular pocket similar to that shown at 27 in FIG. 5 is formed within the head end of said shank and extends longitudinally of the shank rather than transversely thereof as in FIG. 1.

The pocket is defined by the angularly related bottom surfaces 75, FIG. 13, which extend down into the top face of the head at one end of shank 71.

Nested within the pocket are the above described one or more inserts 29 spaced apart by spacers 77 if more than one insert is provided and held down by the clamp construction 33 the same as above described, except that the clamp is of sufficient width as to operatively engage one or more inserts 29 nested within said angular pocket.

The inserts may be of the same width as shown or may be of different widths depending upon the nature of the external grooves to be formed in the workpiece. Additionally, the inserts could be of different length if it is decided that the groove are to be of different depths. There is additionally provided the laterally locking device in the form of a cam wedge 45 of the same construction as above described with respect to FIGS. 3 and 4 and which engage a suitable spacer 77 for operatively and retainingly engaging the outermost from 29 and successively, the additional inserts and spacers with respect to the head edge plate 73. The construction of the insert is the same.

Having described my invention, reference should now be had to the following claims. I claim:

1. An indexable insert for cutting internal and external grooves in a workpiece adapted for mounting and securing upon a tool holder;
    said insert comprising an elongated body of general rectangular cross section;
    a normally flat top surface along one edge of the body;
    and a pair of angular bottom surfaces extending from a central part of the body lengthwise thereof and inclined toward and extending to adjacent said top surface at an included obtuse angle in the range of about 130° to 150°;
    said bottom surfaces terminating in end faces which extend to and define with said top surface a pair of separately usable transverse cutting edges at opposite ends of the body.

2. In the insert claim 1, said obtuse angle being 140° approximately.

3. In the indexable insert of claim 1, said flat top upon the outer one half of each end thereof having cut thereinto an angular grind in the range of 0° to 15°, running downward from said top and extending outward about parallel to an adjacent bottom surface and terminating at a cutting corner.

4. In the insert of claim 1, said end faces being cut away at relief angles of about 0° to 15° from a normal to said top surface, defining an acute angle therebetween.

5. In the insert of claim 4, said body adjacent its ends having opposed side walls which taper outwardly to maximum width at said cutting edges.

6. In an indexable insert grooving tool having a shank having spaced ends, one end mountable in a slide and a head at its other end, there being a pocket in said head including a pair of bottom edges and a back up wall, said bottom edges defining an included obtuse angle in the range of about 130° to 150° and whose one side defines said back up wall; the improvement comprising:
    an indexable insert nested in said pocket bearing against said back up wall and secured therein;
    said insert including an elongated body of general rectangular cross section and having spaced ends;
    a normally flat top surface across one edge of the body;
    and a pair of angular bottom surfaces extending from a central point of the body lengthwise thereof and inclined toward and extending to adjacent said top surface at an included obtuse angle corresponding to the angle between said pocket bottom edges;
    said bottom surfaces terminating in end faces which extend to and define with said top surface a pair of separately usable transverse cutting edges at opposite ends of said body, said body adapted for snug registry within said pocket, one end of said body projecting from said head.

7. In the grooving tool of claim 6, said obtuse angle being 140° approximately.

8. In the grooving tool of claim 6, said body having opposed faces at its opposite ends extending at right angles approximately to said cutting edges said faces being cut away at relief angles of about 0° to 10° extending inwardly from a maximum width at the cutting edges.

9. In an indexable insert grooving tool having a shank having spaced ends, with a longitudinal axis and at one end mountable in a slide, and a head on the other end of said shank and laterally displaced therefrom, said head having a flat top surface coplaner with said axis;
    there being a pocket in said head below said top surface including a pair of bottom edges and a back up wall, said bottom edges defining an included obtuse angle of 140° approximately and whose one side defines said back up wall;
    one bottom edge being inclined upwardly and inwardly into said head below said top surface and the other bottom edge being shorter than said one bottom edge and terminating at the side of the head below said top surface;
    and an indexable insert snugly nested within said pocket bearing against said back up wall and secured therein;
    said insert including a body of general rectangular cross section and having spaced ends;
    a normally flat top surface along one edge of said body coplaner with said head top surface;
    and a pair of angular bottom surfaces extending from a central point of the body and inclined toward and extending to adjacent said top surface at an included obtuse angle corresponding to the angle between said pocket bottom edges, said bottom surfaces terminating in end faces which extend to and define with said top surface a pair of separately usable transverse cutting edges at opposite ends of the body, said body adapted for snug registry within said pocket, one end of said insert projecting laterally of said head adapted to cut an annular groove within the bore of a workpiece rotating on an axis corresponding to the axis of said shank.

10. In the grooving tool of claim 9, the securing of said insert within said head including a clamp secured upon said head and bearing against the top edge of said insert;
    and a cam locking device secured on said head bearing against one side of said insert securing it against said back up wall.

11. In the grooving tool of claim 10, a spacer interposed between said insert and said cam locking device.

12. In the grooving tool of claim 9, said pocket extending at right angles to the longitudinal axis of said shank.

13. In the grooving tool of claim 9, additional spaced indexable inserts nested and secured within said pocket, parallel to and spaced from said insert; and spacers between said inserts; the securing of said inserts within said pocket including a clamp secured upon said head and bearing against the top edges of said inserts; and a cam locking device secured upon said head bearing against the outer of said inserts securing all inserts against said back up wall.

14. In the grooving tool of claim 13, a spacer interposed between said outermost insert and said cam locking device.

15. In the indexable insert of claim 9, said body upon the outer one half of each end thereof having cut into the sides thereof an outwardly extending angular grind in the range of 0° to 15°, extending from said top surface to an adjacent bottom surface, terminating at said cutting edge.

* * * * *